Nov. 22, 1966   E. P. SUNDHOLM   3,286,887
PLUNGER ASSEMBLY FOR HAND-OPERATED GREASE GUN
Filed June 24, 1965
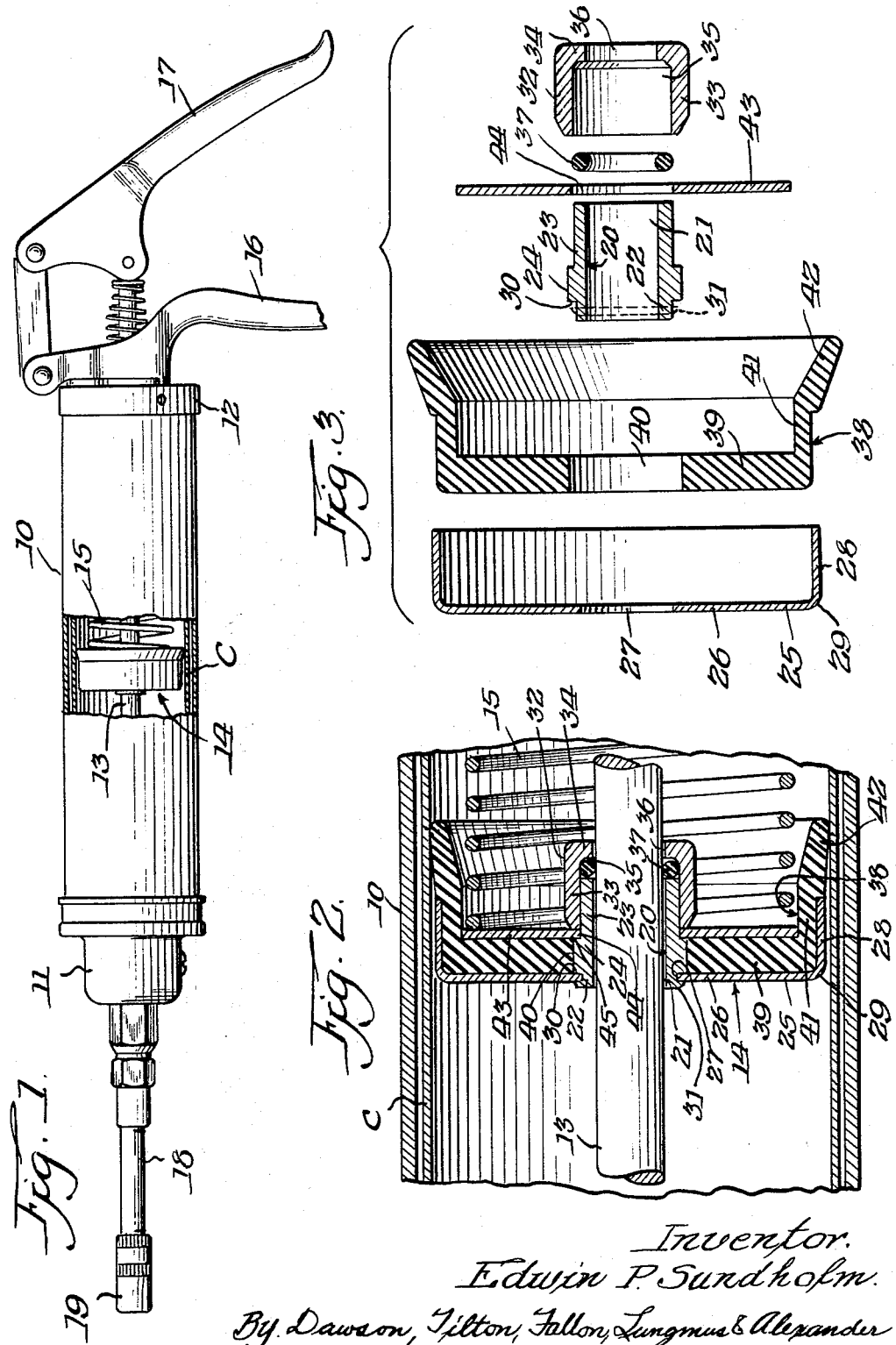
Inventor.
Edwin P. Sundholm.
By Dawson, Tilton, Fallon, Lungmus & Alexander
Attys.

United States Patent Office 3,286,887
Patented Nov. 22, 1966

3,286,887
PLUNGER ASSEMBLY FOR HAND-OPERATED
GREASE GUN
Edwin P. Sundholm, Albert City, Iowa
Filed June 24, 1965, Ser. No. 466,729
3 Claims. (Cl. 222—386)

This application is a continuation-in-part of my copending application Serial No. 444,156, filed March 31, 1965, for "Axially-Operated Hand Grease Gun."

This invention relates to a plunger assembly for a hand-operated grease gun. More particularly, the plunger assembly of this invention is adapted for use with a hand grease gun of the kind having a cylindrical grease container with a plunger rod extending axially therein. The plunger assembly of this invention may be used with particular advantage for grease guns employing cartridge-packaged greases which are also adapted for use with bulk-filled greases.

A principal object of the present invention is to provide a plunger assembly for hand-operated grease guns which is simpler and less expensive in construction, more compact, and more effective than plunger assemblies which have heretofore been provided. A further specific object is to provide a plunger assembly of the character described which is adapted for use with grease cartridges, and which tends to correct or overcome the problems created by defective, wrinkled, or distorted cartridges. Still another object is to provide a plunger assembly which expels air from the rear end of the grease cartridge. Further objects and advantages will be indicated in the following detailed specification.

This invention is shown in an illustrative embodiment in the accompanying drawing, wherein:

FIGURE 1 is a side elevational view of a grease gun with which the plunger assembly of this invention may be employed, the side wall of the barrel being broken away to show the plunger assembly therein;

FIG. 2 is an enlarged side sectional view showing the plunger assembly within a grease gun loaded with a grease cartridge; and FIG. 3 is a side sectional view of the components of the plunger assembly of this invention, the parts being shown in separated relation.

Looking first at FIGURE 1, there is shown a grease gun having a cylindrical barrel or grease container 10. A removable front cap 11 is threadedly connected to the front end portion of container 10, and a rear cap 12 is fixedly mounted on the rear end portion of container 10. An operating or plunger rod 13 extends axially within barrel 10. The plunger assembly of this invention, which is designated generally by the number 14, is slidably received on rod 13, and is urged toward the forward portion of the grease container 10 by a compression spring 15.

Since the particular actuating and dispensing mechanism of the grease gun shown in FIG. 1 has no direct relation to the subject matter of this application, it will not be described in detail herein. However, all of the details are described in the cited copending application, Serial No. 444,156.

In general, the grease gun of FIG. 1 includes a fixed handle 16 and a movable handle 17 which are mounted on rear cap 12 for imparting reciprocating motion to rod 13, which in turn reciprocates a piston within a high pressure cylinder mounted within front cap 11. The valve-controlled outlet from the high pressure cylinder discharges grease under pressure through applicator pipe 18 to grease fitting connector 19.

Since the plunger assembly of this invention is particularly designed for use with cartridge-loading grease guns, a grease cartridge C is shown within the grease container 10, and a section of the grease cartridge C is also shown in FIG. 2.

As shown more clearly in FIGS. 2 and 3, the plunger assembly of this invention includes a cylindrical sleeve designated generally by the number 20. Sleeve 20 provides a bore 21 which extends therethrough for slidably receiving the rod 13. For purpose of orientation, sleeve 20 may be further designated as providing a forward end portion 22, a rearward end portion 23, and an intermediate body portion 24.

In accordance with the present invention, there is provided a guide cup 25 which is rigidly mounted on the forward end portion of sleeve 20. The cup 25 includes a transverse wall 26 which provides a central opening 27 for receiving the forward end portion 22 of sleeve 20, as shown in FIG. 2. Guide cup 25 also includes a cylindrical wall 28 concentric with sleeve 20 and extending rearwardly from the outer periphery of transverse wall 26. Preferably, guide cup 25 is formed from an integral piece of metal, such as sheet steel, and a smoothly rounded corner is provided between transverse wall 26 and cylindrical portion 28, as indicated at 29.

Guide cup 25 may be advantageously mounted on sleeve 20 by the transverse wall 26 of the cup being swaged to the sleeve forward end portion 22. More specifically, sleeve forward end portion 22 may be of slightly reduced diameter as compared with the sleeve central or body portion 25, and an annular offset or shoulder 30 provided therebetween. The rear portion of transverse wall 26 adjacent opening 27 will bear against the shoulder 30, as shown in FIG. 2, and the sleeve will project slightly beyond the front face of wall 26 so that it may be swaged as indicated at 31. The appearance of the forward end 22 of the sleeve before the assembly of the parts and the forming of the swage connection is shown in FIG. 3. The turning outwardly of the front end of sleeve 20 to form the swage portion 31 is indicated in dotted lines. In this way, the cup 25 is securely and rigidly mounted on the sleeve.

A cap 32 is mounted on the rear end portion 23 of the sleeve 20. Cap 32 has a cylindrical wall 33 which engages the outside of rear end portion 23 and projects rearwardly therebeyond, as shown more clearly in FIG. 2. Cap 32 also has a transverse wall 34 which extends across the projecting end of cylindrical wall 33 so as to provide an annular space 35 between the rear end of sleeve portion 23 and transverse cap wall 34. Cap wall 34 is provided with a central opening 36 for slidably receiving rod 13.

Cap 32 may be advantageously mounted on sleeve portion 23 by means of a press-fit, the inside diameter of cap 32 being such that when it is forced onto sleeve portion 23, it will be frictionally retained thereon.

An O-ring sealing member 37 is received in annular space 35. The outside of the O-ring 37 seals against the inside of cap 32 and the inside of O-ring 37 is dimensioned to form a sliding grease-tight seal with rod 13. O-ring 37 should be formed of a resilient, grease-resistant material such as synthetic rubber.

Annular sealing means designated generally as 38 is mounted adjacent the rearward end of guide cap cylindrical wall 28. The sealing means 38 should have a greater normal outside diameter than the outside diameter of guide cap cylindrical wall 28 for providing a sliding, grease-tight seal around the outside of the plunger assembly, either with the inside of the cartridge C or the inside of the grease container 10. In the illustration given, sealing means 38 is in the form of a molded plunger cup formed of grease-resistant synthetic rubber. The cup has a transverse wall 39 which provides a central opening 40, and a cylindrical wall 41 extending rearwardly from the outer periphery of wall 39, and terminating in an outwardly and rearwardly-extending annular lip 42. Lip 42 provides the resilient, flexible sealing means which is adaptable to sealing with either the grease cartridge or the grease container.

In the illustration given, the cylindrical wall 41 of the plunger cup 38 has an outside diameter corresponding with the inside diameter of the cylindrical wall 28 of guide cup 26, so that the forward portion of plunger cup 38 may be received within guide cup 25, as shown in FIG. 2, and the annular lip 42 being outside of the guide cup. Opening 40 in plunger cup 38 has a diameter substantially the same as the external diameter of sleeve body portion 24 so that it may be received thereon, as shown in FIG. 2.

Instead of the plunger cup sealing means described herein, the plunger assembly of this invention may be provided with other sealing means, such as the sealing means described in my copending application Serial No. 449,538, filed April 20, 1965. Where a molded plunger cup, such as cup 38 is employed, the plunger assembly may also advantageously include a transversely extending rear disc 43 having a central opening 44 therein. As shown, sleeve rear portion 23 extends through the opening 44, and the disc 43 is mounted thereon against the shoulder 45 which is provided between sleeve body portion 24 and the rearward portion 23 of reduced diameter. In this position, the front face of disc 43 bears against the rear face of plunger cup wall 39 and provides support therefor, as shown in FIG. 2. The forward end of cap 33 may bear against the rear side of disc 43 to hold the disc in place, as shown, or other means may be provided for securing disc 43 in position.

It will be apparent from the foregoing description that the plunger assembly of this invention may be readily disassembled, as may be required to replace the sealing means, such as the plunger cup 38. After the plunger assembly has been removed from rod 13, cap 32 can be withdrawn from the rearward portion 23 of the sleeve, these parts only being connected by a press-fit. The rear disc 43 and the plunger cap 38 can then be withdrawn over the rearward portion of the sleeve. The plunger cup then can be replaced as required and the parts readily reassembled.

As previously indicated, the plunger assembly of this invention has particular utility in grease guns employing cartridge-packaged greases. The grease cartridges are normally formed of relatively lightweight paperboard, and are thereby subject to bending, wrinkling, and otherwise being distorted or not truly cylindrical. Such wrinklings or distortions can interfere with the insertion of the plunger assembly and with its proper operation therein. The guide cup 25 of the plunger assembly of this invention tends to overcome these problems and difficulties. The configuration of the guide cup tends to facilitate the insertion of the plunger assembly in the rear end of the grease cartridge, even though the end may be bent, distorted, or wrinkled. Moreover, the guide cup 25 will tend to smooth and straighten the cylindrical wall of the grease cartridge as it moves forwardly therein during the dispensing of the grease. Guide cup 25 also serves to expel air for the rear end of the grease cartridge as it is inserted, thereby preventing the air from being trapped within the cartridge where it can interfere with the dispensing of the grease.

While, in the foregoing specification, this invention has been described in relation to a specific preferred embodiment thereof, and many details have been set forth for purpose of illustration, it will be apparent to those skilled in the art that the invention is susceptible to additional embodiments and that certain of the details set forth herein can be varied considerably without departing from the basic principles of the invention.

I claim:
1. In a hand-operated grease gun of the kind having a cylindrical grease container with a rod extending axially therein, said grease gun being adapted for use with both cartridge-packaged greases and bulk-filled greases, the plunger assembly including:
   (a) a cylindrical sleeve having a forward end and a rearward end and providing a bore therethrough for slidably receiving said rod;
   (b) a guide cup rigidly mounted on the forward end portion of said sleeve,
      said cup having a transverse wall providing a central opening therein receiving said forward end portion and a cylindrical wall concentric with said sleeve extending rearwardly from the outer periphery of said transverse wall,
      the outside of said cylindrical wall being spaced inwardly from the inside of said grease container for insertion within a grease cartridge;
   (c) sealing means carried by said sleeve providing a sliding grease-tight seal with said rod; and
   (d) annular sealing means mounted adjacent the rearward end of said guide cup cylindrical wall,
      said sealing means having a greater normal outside diameter than the outside diameter of said guide cup cylindrical wall for selectively providing a sliding grease-tight seal around the outside of said plunger assembly with either the inside of said grease container or the inside of a grease cartridge.

2. The plunger assembly of claim 1 wherein said guide cup transverse wall and cylindrical wall are formed from an integral piece of metal and a rounded corner is provided therebetween.

3. The plunger assembly of claim 1 wherein said annular sealing means is a cup-shaped member of resilient material, said member having a transverse wall extending behind the transverse wall of said guide cup, a support disc carried by said sleeve and bearing against the rear wall of said cup-shaped member, the said transverse wall of said cup-shaped member providing an opening receiving the central portion of said sleeve, said sealing member providing a rearwardly and outwardly extending lip portion for selectively sealing with either said grease container or a grease cartridge.

References Cited by the Examiner

UNITED STATES PATENTS

| | | | |
|---|---|---|---|
| 1,915,512 | 5/1933 | Bizzarri | 222—262 X |
| 2,569,903 | 10/1951 | Santarelli | 222—263 X |
| 3,038,768 | 5/1962 | Kludt | 222—256 X |

FOREIGN PATENTS 1,270,689  7/1961  France.

ROBERT B. REEVES, *Primary Examiner.*

HADD S. LANE, *Examiner.*